United States Patent [19]
Friedli et al.

[11] Patent Number: 4,913,603
[45] Date of Patent: Apr. 3, 1990

[54] SPIRAL DRILL

[75] Inventors: Paul Friedli, Rüttenen; Georges Petignat, Alle; Jean-Marc Salomon, Porrentruy, all of Switzerland

[73] Assignee: Sphinzwerke Muller AG, Solothurn, Switzerland

[21] Appl. No.: 236,228

[22] PCT Filed: Nov. 24, 1987

[86] PCT No.: PCT/CH87/00155
§ 371 Date: Jul. 18, 1988
§ 102(e) Date: Jul. 18, 1988

[87] PCT Pub. No.: WO88/03849
PCT Pub. Date: Jun. 2, 1988

[30] Foreign Application Priority Data
Nov. 25, 1986 [CH] Switzerland .......................... 4703/86

[51] Int. Cl.⁴ .............................................. B23B 51/02
[52] U.S. Cl. ...................................... 408/230; 408/227
[58] Field of Search ................ 408/199, 227, 229, 230

[56] References Cited
U.S. PATENT DOCUMENTS

| Re. 24,769 | 1/1960 | Willingham | 408/227 |
| 2,370,706 | 3/1945 | Andreasson . | |
| 2,795,979 | 6/1957 | Zerwick | 408/229 |
| 3,237,488 | 3/1966 | Parone et al. | 408/230 |
| 3,598,500 | 8/1971 | Oxford, Jr. | 408/210 |
| 4,662,803 | 5/1987 | Arnold | 408/230 |

FOREIGN PATENT DOCUMENTS

| 576265 | 5/1933 | Fed. Rep. of Germany . | |
| 764041 | 5/1934 | France . | |
| 2193673 | 2/1974 | France . | |
| 93519 | 4/1988 | Japan | 408/227 |
| 1298008 | 3/1987 | U.S.S.R. | 408/199 |
| 147631 | 12/1921 | United Kingdom . | |

Primary Examiner—Daniel Howell
Attorney, Agent, or Firm—Helfgott & Karas

[57] ABSTRACT

A two-flute drill bit includes two drill webs each provided with a cutting lip. The cutting lips are unequally angularly spaced from each other and the smaller one of two pitch angles included between two cutting lips is preferably 160°. One of the webs has two peripheral margin lands spaced from each other whereby a three-point guidance of the drill bit is obtained.

4 Claims, 1 Drawing Sheet

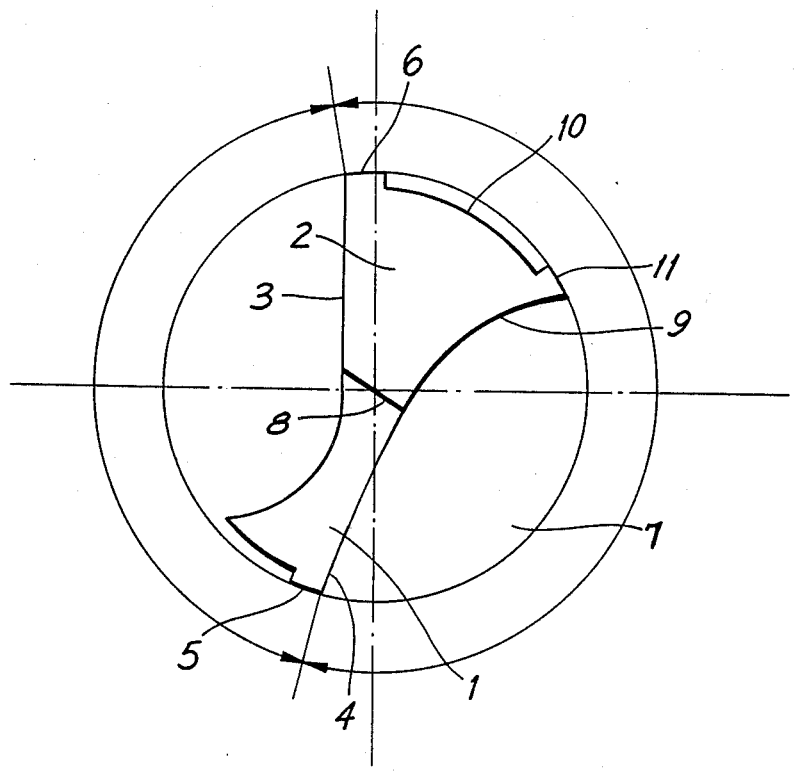

SPIRAL DRILL

In the known two-flute twist drills the cutting lips are arranged symmetrically to another.

Due to this symmetrical arrangement the drill has a chattering tendency, which leads to the cutting lips becoming prematurely blunt. The wall of the hole has trench-like tracks, which can only be smoothed by a second operation, e.g. by rubbing or abrasion. The circularity quality of the hole is often inadequate (polygon formation).

The precisely symmetrical pair of cutting lips also leads to the clogging of the flutes when drilling materials which form voluminous chips.

The work of a drill is in two parts, namely a cutting part and a non-cutting part. The actual cutting work is carried out by the starting portion of the drill, i.e. the drill point or bit and the non-cutting work is carried out by a guide part or circular land, which acts as a size and surface-forming part. The function of the circular land is to guide the tool in the hole. In the case of two-flute drills there are only two circular lands, so that guidance is inadequate.

The problem of the present invention is to avoid the aforementioned disadvantages of known two-flute twist drills.

In the twist drill according to the invention the chattering tendency is eliminated and a high hole circularity quality is attained. The second circular land on one of the drill webs leads to a three-point guidance of the drill in the hole and also improves the non-cutting work of the drill.

The invention is described in exemplified manner hereinafter relative to the figure, which is an axial view of the drill bit.

The drill has two drill webs 1,2 with the two cutting lips 3,4. The drill webs 1,2 have circular lands 5,6. The cutting lips have an unequal angular spacing. The pitch angle $\alpha$ is 110° to 175°, whilst the other pitch angle $\beta$ is 185° to 250°. Preference is given to a pitch angle $\alpha$ of 165° or $\beta$ of 195°.

Flute 7 is defined by a surface represented by line 9 in the drawing. However, preference is given to an embodiment in which the drill web 2 is widened compared with drill web 1. At the end of the clearance 10 facing the circular land 6 a second circular land 11 of web 2 is connected thereto. Thus, the drill has a three-point guidance in the hole. As a result of a point thinning of the chisel edge 8, the axial force is significantly reduced.

We claim:

1. A two-flute drill, comprising a drill bit including two drill webs each having a cutting lip, said cutting lips of said webs being unequally angularly spaced from each other so that said cutting lips include with each other a first pitch angle ($\alpha$) in one circumferential direction and a second pitch angle ($\beta$) in an opposite circumferential direction, said first pitch angle being smaller than said second pitch angle, said first pitch angle being in the range between 110° and 175°, each of said drill webs having a peripheral margin land, and one of said drill webs including an additional peripheral margin land in the region of said second pitch angle, said one of said drill webs being wider in a circumferential direction than another of said drill webs.

2. The twist drill according to claim 1, wherein said first pitch angle ($\alpha$) is 165°.

3. The twist drill according to claim 1, wherein said peripheral margin land of said one of said drill webs is circumferentially spaced from said additional peripheral margin land thereof by a clearance.

4. The twist drill according to claim 3, wherein said peripheral margin lands of said drill webs and said additional peripheral margin land of one of said drill webs are located on a cylindrical surface, the diameter of which corresponds to the diameter of a hole to be produced.

* * * * *

UNITED STATES PATENT AND TRADEMARK OFFICE
CERTIFICATE OF CORRECTION

PATENT NO. : 4,913,603

DATED : April 3, 1990

INVENTOR(S) : PAUL FRIEDLI, GEORGES PETIGNAT and JEAN-MARC SALOMON

It is certified that error appears in the above-identified patent and that said Letters Patent is hereby corrected as shown below:

On cover page of patent, please change Assignee's name to read as follows:

Change "Sphinzwerke" to -- Sphinxwerke --.

Signed and Sealed this

Eighth Day of September, 1992

Attest:

DOUGLAS B. COMER

*Attesting Officer*   *Acting Commissioner of Patents and Trademarks*